(12) United States Patent
Chennamsetty et al.

(10) Patent No.: US 9,389,950 B2
(45) Date of Patent: Jul. 12, 2016

(54) TECHNIQUES FOR INFORMATION PROTECTION IN A SOLID-STATE DEVICE BASED STORAGE POOL

(71) Applicant: INTERNATIONAL BUSINESS MACHINES CORPORATION, Armonk, NY (US)

(72) Inventors: Ramamohan Chennamsetty, Highland, NY (US); Nataraj Nagaratnam, Cary, NC (US); Sandeep P. Patil, Pune (IN); Riyazahamad M. Shiraguppi, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 14/542,088

(22) Filed: Nov. 14, 2014

(65) Prior Publication Data

US 2016/0139981 A1    May 19, 2016

(51) Int. Cl.
| | |
|---|---|
| *G11C 29/00* | (2006.01) |
| *G06F 11/10* | (2006.01) |
| *G06F 12/02* | (2006.01) |
| *G06F 3/06* | (2006.01) |

(52) U.S. Cl.
CPC .......... *G06F 11/1008* (2013.01); *G06F 3/0619* (2013.01); *G06F 12/0246* (2013.01); *G06F 2212/7206* (2013.01)

(58) Field of Classification Search
CPC . G06F 11/1004; G06F 11/1008; G06F 11/10; G06F 11/1076; G06F 12/0246; G06F 3/0619
See application file for complete search history.

(56) References Cited

U.S. PATENT DOCUMENTS

| | | | |
|---|---|---|---|
| 7,529,967 B2* | 5/2009 | Findleton | G06F 11/1076 714/42 |
| 8,458,287 B2 | 6/2013 | Ozzie et al. | |
| 8,811,074 B2* | 8/2014 | Goss | G11C 16/26 365/185.02 |
| 2012/0066435 A1 | 3/2012 | Colgrove et al. | |
| 2013/0132800 A1* | 5/2013 | Healey, Jr. | G06F 3/0607 714/769 |
| 2013/0204849 A1 | 8/2013 | Chacko | |
| 2013/0282994 A1 | 10/2013 | Wires et al. | |
| 2014/0025770 A1 | 1/2014 | Warfield et al. | |

OTHER PUBLICATIONS

Burns et al., Rethinkingerasure codes for cloud file systems: minimizing I/O for recovery and degraded reads, 2012, usenix.org, (retrieved from google.com Mar. 14, 2016), pp. 1 to 14.*

(Continued)

*Primary Examiner* — Shelly A Chase
(74) *Attorney, Agent, or Firm* — Brian F. Russell; Diana L. Roberts

(57) ABSTRACT

A technique for protecting stored information from read disturbance includes receiving a first write request to a solid-state device (SSD) in a storage pool that employs an erasure code. The first write request has an associated identifier and associated data. In response to receiving the first write request, the first write request is assigned to two or more SSD blocks of the SSD device based on the identifier. Pages of the associated data are then written to the assigned SSD blocks, such that each SSD block holds data associated with only a single identifier.

20 Claims, 7 Drawing Sheets

(56) References Cited

OTHER PUBLICATIONS

Rimal, Bhaskar Prasad, et al; "Architectural requirements for cloud computing systems: an enterprise cloud approach." Journal of Grid Computing 9, No. 1 (2011): 3-26.

Bhadauria, Rohit, et al; "Survey on Security Issues in Cloud Computing and Associated Mitigation Techniques." International Journal of computer applications 47 (2012).

* cited by examiner

| SSD Disk No. | SSD Block No. | Owner | Status | Free Pages |
|---|---|---|---|---|
| 1 | 1 | Tenant1 ID | Partially-filled | 2 |
| 1 | 2 | | Empty | 4 |
| 1 | 3 | Tenant2 ID | Full | 0 |
| 1 | 4 | | Empty | 4 |
| 2 | 1 | Tenant2 ID | Full | 0 |
| 2 | 2 | Tenant1 ID | Partially-filled | 2 |
| 2 | 3 | | Full | 4 |
| 2 | 4 | | Full | 4 |
| 3 | 1 | Tenant2 ID | Empty | 0 |
| 3 | 2 | Tenant1 ID | Partially-filled | 2 |

FIG. 6

TECHNIQUES FOR INFORMATION PROTECTION IN A SOLID-STATE DEVICE BASED STORAGE POOL

BACKGROUND

The present disclosure is generally directed to techniques for information protection and, more specifically, to techniques for information protection in a solid-state device based storage pool.

In general, cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (PM), e.g., a computer system, that executes instructions like a PM. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying PM resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

An erasure code is a forward error correction (FEC) code for a binary erasure channel (common communication channel) that transforms a message of 'k' symbols into a longer message (codeword) with 'n' symbols such that the original message can be recovered from a subset of the 'n' symbols. Erasure codes, which may be used for storage protection in various storage systems (e.g., RAID 6 storage systems), are poised to underpin future storage systems, including cloud-based storage systems. An erasure code provides redundancy by breaking objects (e.g., an application block) into smaller fragments and storing the fragments in different places (e.g., on different hard disk drives (HDDs)). Using an erasure code, data can be recovered from a combination of less than all fragments of the data. An encoding rate 'r' is equal to 'm' divided by 'n' (where 'm' is the number of verified data fragments required to reconstruct original data and 'n' is total number of data fragments in the original data plus parity fragments) and is always less than one.

A solid-state drive (SSD) is a data storage device that uses solid-state memory to store persistent data with the intention of providing access in the same manner as a traditional block input/output (I/O) HDD. SSDs employ integrated circuits (chips) that retain data in non-volatile memory and include no moving parts. SSDs are typically less susceptible to physical shock, are silent, have lower access time and latency than HDDs, but are more expensive per gigabyte (GB) than HDDs. Most SSDs use NAND-based flash memory (flash), which retains memory state even without power. Flash stores information in an array of memory cells constructed from floating-gate transistors. Flash is accessed similar to other block devices, e.g., HDDs and memory cards. Each SSD block includes a number of pages that are typically 512, 2048, or 4096 bytes in size. Associated with each page are a few storage bytes (typically $\frac{1}{32}$ of the data size) that can be used to store an error correcting code (ECC) checksum. Typical SSD block sizes include: 16 kB (32 pages of 512+16 bytes each); 128 kB (64 pages of 2048+64 bytes each); 256 kB (64 pages of 4096+128 bytes each); and 512 kB (128 pages of 4096+128 bytes each). For example, a 2 GB SSD with sixty-four pages (2 k size each) per SSD block has 2048 SSD blocks.

BRIEF SUMMARY

Disclosed are a method, a data processing system, and a computer program product (embodied in a computer-readable storage device) for information protection in a solid-state device based storage pool.

A technique for protecting stored information from read disturbance includes receiving a first write request to a solid-state device (SSD) in a storage pool that employs an erasure code. The first write request has an associated identifier and associated data. In response to receiving the first write request, the first write request is assigned to two or more SSD blocks of the SSD device based on the identifier. Pages of the associated data are then written to the assigned SSD blocks, such that each SSD block holds data associated with only a single identifier.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 6 is a data structure (e.g., a table) that provides an SSD disk list, according to various embodiments of the present disclosure.

DETAILED DESCRIPTION

Figure 1:
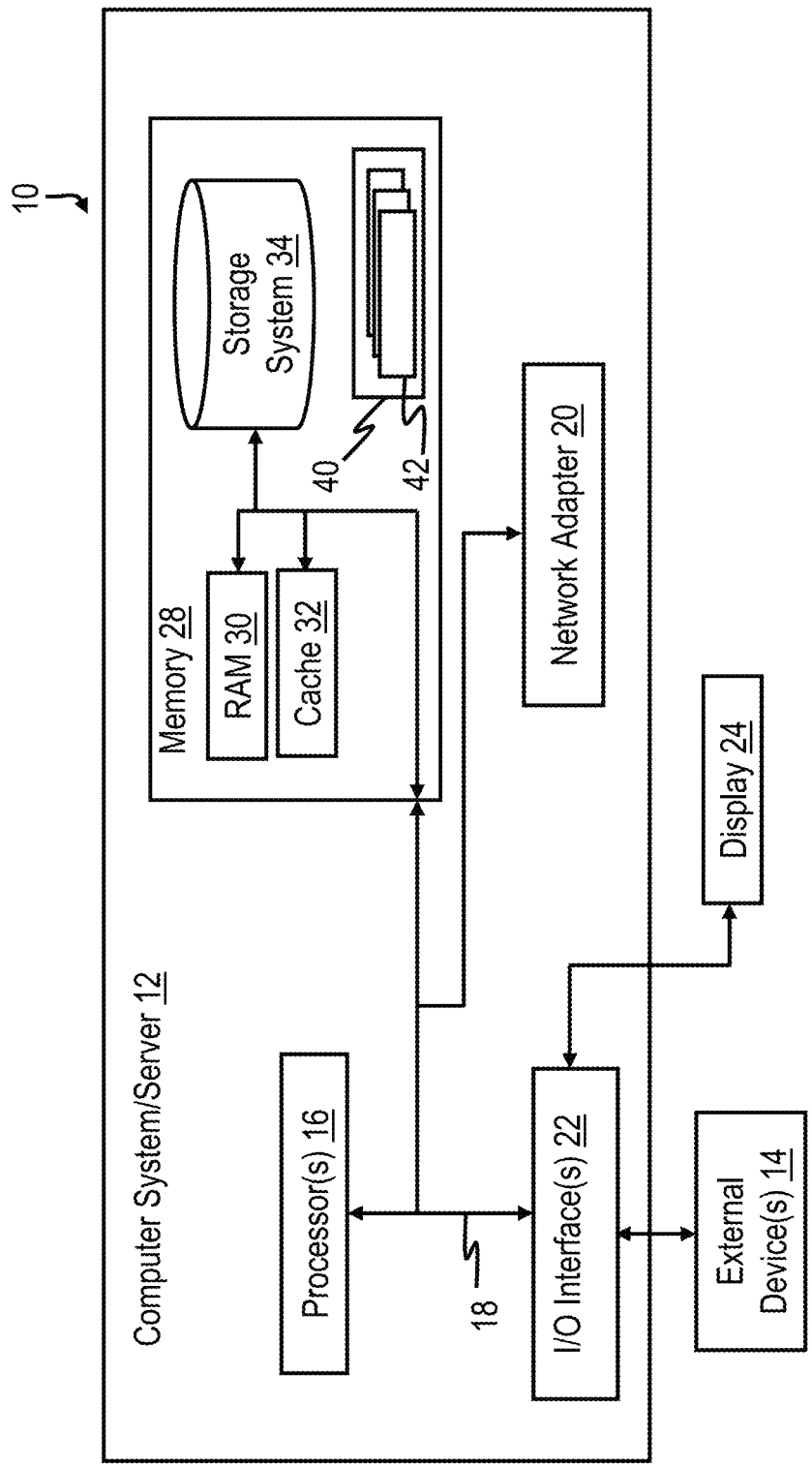
FIG. 1 depicts a relevant portion of an exemplary cloud computing node that is configured according to an embodiment of the present disclosure.

The illustrative embodiments provide a method, a data processing system, and a computer program product (embodied in a computer-readable storage device) for information protection in a solid-state device based storage pool.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

It should be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

On-demand self-service means a cloud consumer can unilaterally provision computing capabilities, such as server time and network storage, as needed automatically without requiring human interaction with a service provider. Broad network access means capabilities are available over a network and accessed through standard mechanisms that promote use by heterogeneous thin or thick client platforms (e.g., mobile phones, laptops, and personal digital assistants (PDAs)). Resource pooling means computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

Rapid elasticity means capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. Measured service means cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

With reference to FIG. 1, a schematic of an exemplary cloud computing node 10 is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein. Cloud computing node 10 includes a computer system/server (or more generally a data processing system) 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 (in cloud computing node 10) is illustrated in the form of a general-purpose computing device. The components of computer system/server 12 may include, but are not limited to, one or more processors or processing units (including one or more processor cores) 16, a system memory 28, and a bus 18 that couples various system components (including system memory 28) to processors 16. Bus 18 represents one or more of any of several types of bus structures, including a memory bus or memory controller bus, a peripheral bus, an accelerated graphics port, and a processor or local bus using any of a variety of bus architectures. By way of example, and not limitation, such architectures include the industry standard architecture (ISA) bus, the micro channel architecture (MCA) bus, the enhanced ISA (EISA) bus, the video electronics standards association (VESA) local bus, and the peripheral components interconnect (PCI) bus.

Computer system/server 12 typically includes a variety of computer system readable media. Such media may be any available media that is accessible by computer system/server 12, and includes both volatile and non-volatile media, removable and non-removable media. System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described herein, memory 28 may include at least one program product having a set (e.g., at least one) of program modules that are configured to carry out the functions of various disclosed embodiments. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more other devices that enable a user to interact with computer system/server 12, and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, redundant array of inexpensive disk (RAID) systems, tape drives, and data archival storage systems, etc.

Figure 2:
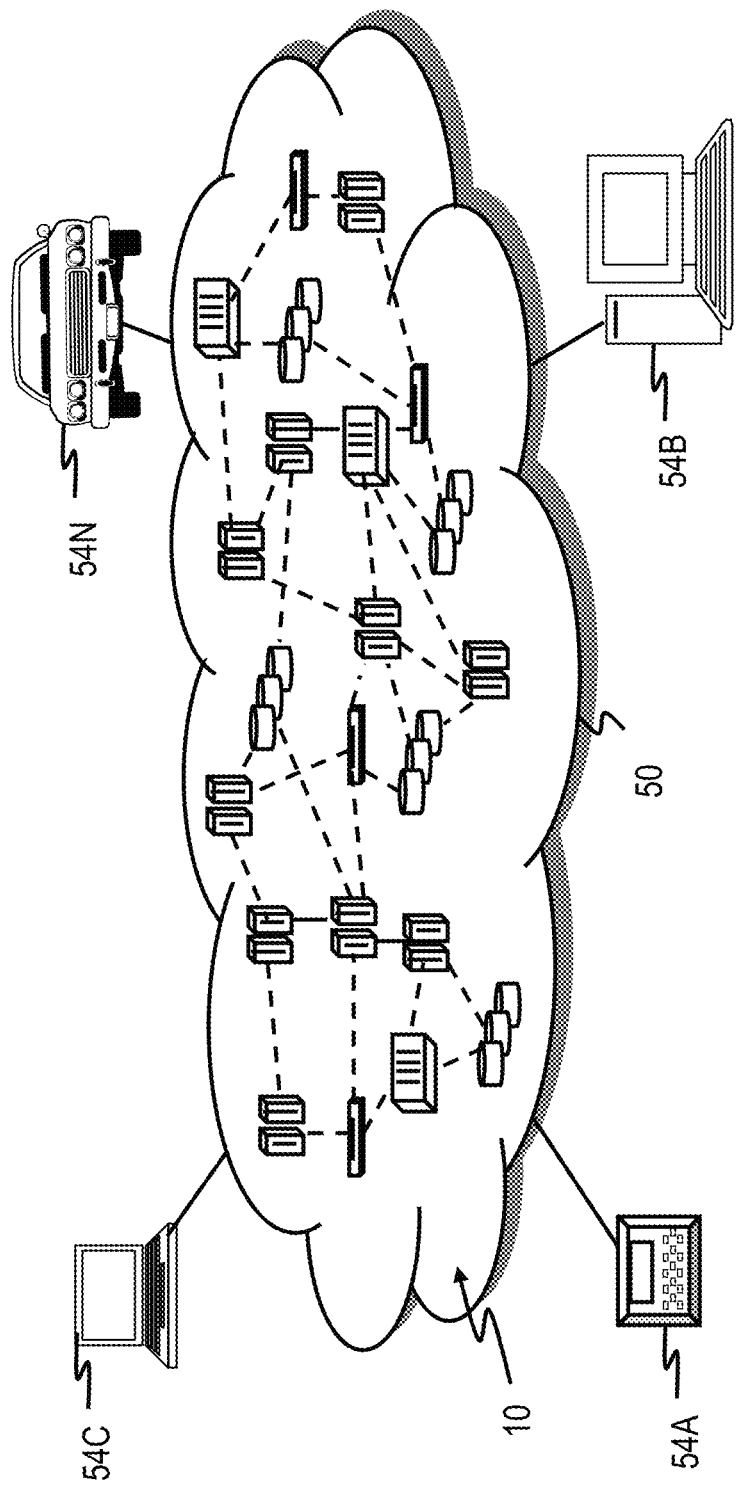
FIG. 2 depicts a relevant portion of an exemplary cloud computing environment that is configured according to an embodiment of the present disclosure.

With reference to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another and may be grouped (not shown) physically or virtually, in one or more networks, such as private, community, public, or hybrid clouds as described herein, or a combination thereof. In this manner, cloud computing environment 50 can offer infrastructure, platforms and/or software as services for which a cloud consumer does not need to maintain resources on a local computing device. It should be understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
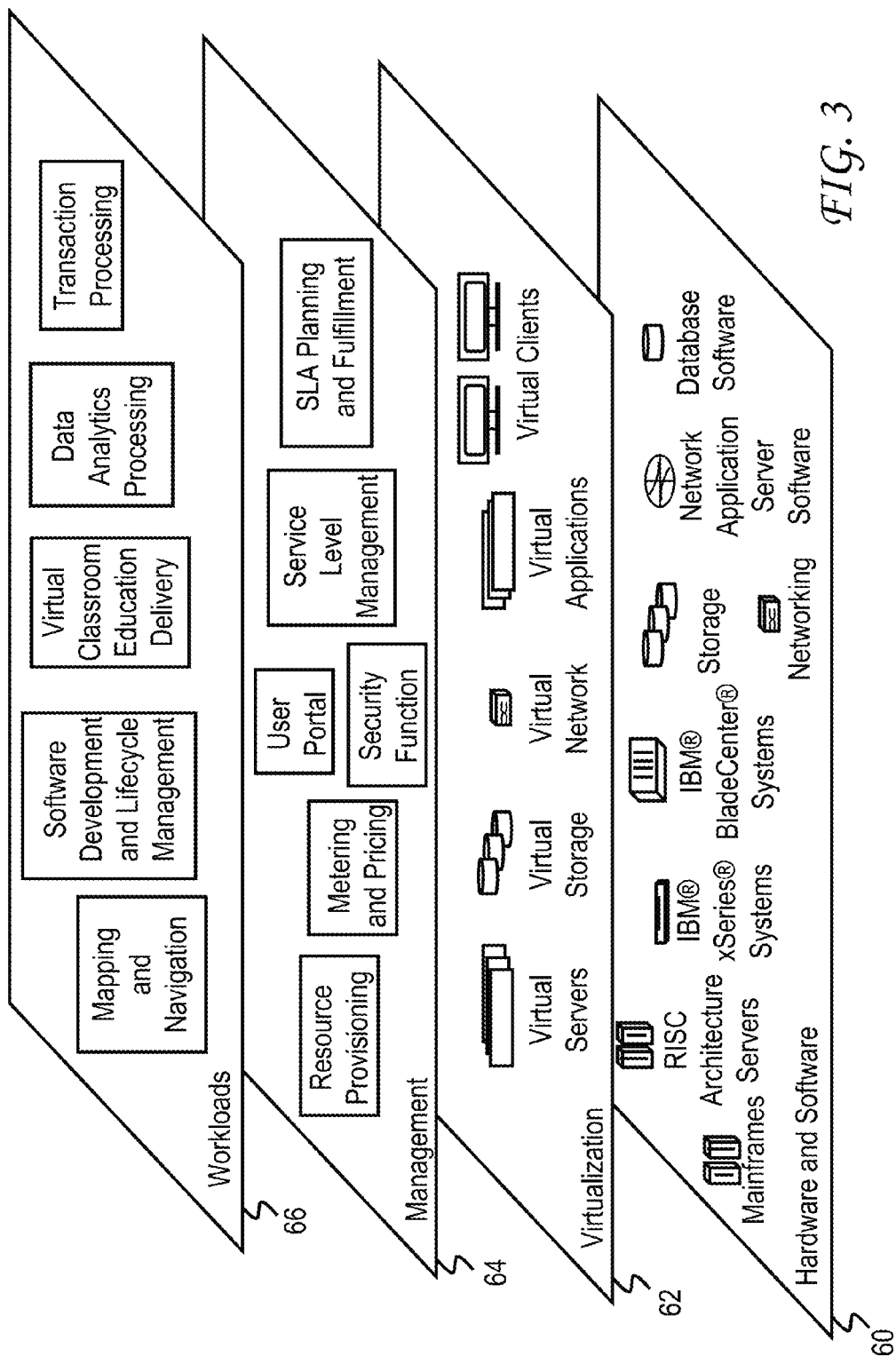
FIG. 3 depicts exemplary abstraction model layers of a cloud computing environment configured according to an embodiment of the present disclosure.

With reference to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted in FIG. 3, cloud computing environment 50 includes a hardware and software layer 60, a virtualization layer 62, a management layer 64, and a workloads layer 66.

Hardware and software layer 60 includes various hardware and software components. As one example, the hardware components may include mainframes (e.g., IBM® zSeries® systems), reduced instruction set computer (RISC) architecture based servers (e.g., IBM® pSeries® systems), IBM® xSeries® systems, IBM® BladeCenter® systems, storage devices, networks and networking components. As another example, the software components may include network application server software (e.g., IBM® WebSphere® application server software) and database software (e.g., IBM® DB2® database software). IBM, zSeries, pSeries, xSeries, BladeCenter, WebSphere, and DB2 are trademarks of International Business Machines Corporation registered in many jurisdictions worldwide.

Virtualization layer 62 provides an abstraction layer in which virtual entities (e.g., virtual servers, virtual storage, virtual networks (including virtual private networks), virtual applications and operating systems, and virtual clients are included. As previously discussed, these virtual entities may be accessed by clients of cloud computing environment 50 on-demand. The virtual entities are controlled by one or more virtual machine monitors (VMMs) that may, for example, be implemented in hardware and software layer 60, virtualization layer 62, or management layer 64.

Management layer 64 provides various functions (e.g., resource provisioning, metering and pricing, security, user portal, service level management, and SLA planning and fulfillment). The resource provisioning function provides dynamic procurement of computing resources and other resources that are utilized to perform tasks within the cloud computing environment. For example, the resource provisioning function may be performed for virtual machines (VMs) by one or more VMMs. The metering and pricing function provides cost tracking (as resources are utilized within the cloud computing environment) and billing or invoicing for consumption of the utilized resources. As one example, the utilized resources may include application software licenses.

The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The disclosed techniques may be advantageously deployed to address data integrity issues related to solid-state device (SSD), e.g., flash memory (flash), based storage systems that employ an erasure code in cloud-based environments. The disclosed techniques may also be advantageously deployed to facilitate secure use of SSD based storage systems that employ an erasure code in a cloud-based multi-tenant environment.

As one example of using an erasure code inside a storage pool, assume an application block size of 4 k and a disk block size of 1 k. In this case, one application block is usually split over four disk blocks of the storage pool. Typically, an erasure code allows for any number of parity blocks for a given application block. As one example, and with reference to FIG. 4, for a storage pool 400 with ten disks 402-420 an administrator may elect to employ a parity block for each group of four disk blocks. In the case of a storage pool with ten disk blocks with a parity block for each group of four disk blocks, three parity blocks are implemented. For an application block with four disk blocks and three parity blocks, the seven blocks (4+3=7) may be assigned to any of seven different disks (out of the ten disks) in storage pool 400. In this case, 'm' is equal to the number of data blocks (four in this example) and 'c' is equal to the number of parity blocks (three in this example) for a total of 'n' blocks (where n=m+c or n=4+3=7). A storage pool configured in this manner can advantageously sustain up to 'c' disk failures. In this example, an erasure code encoding rate 'r' is equal to the number of data blocks (four) divided by the total number of blocks (seven) for the given application block.

Figure 4:
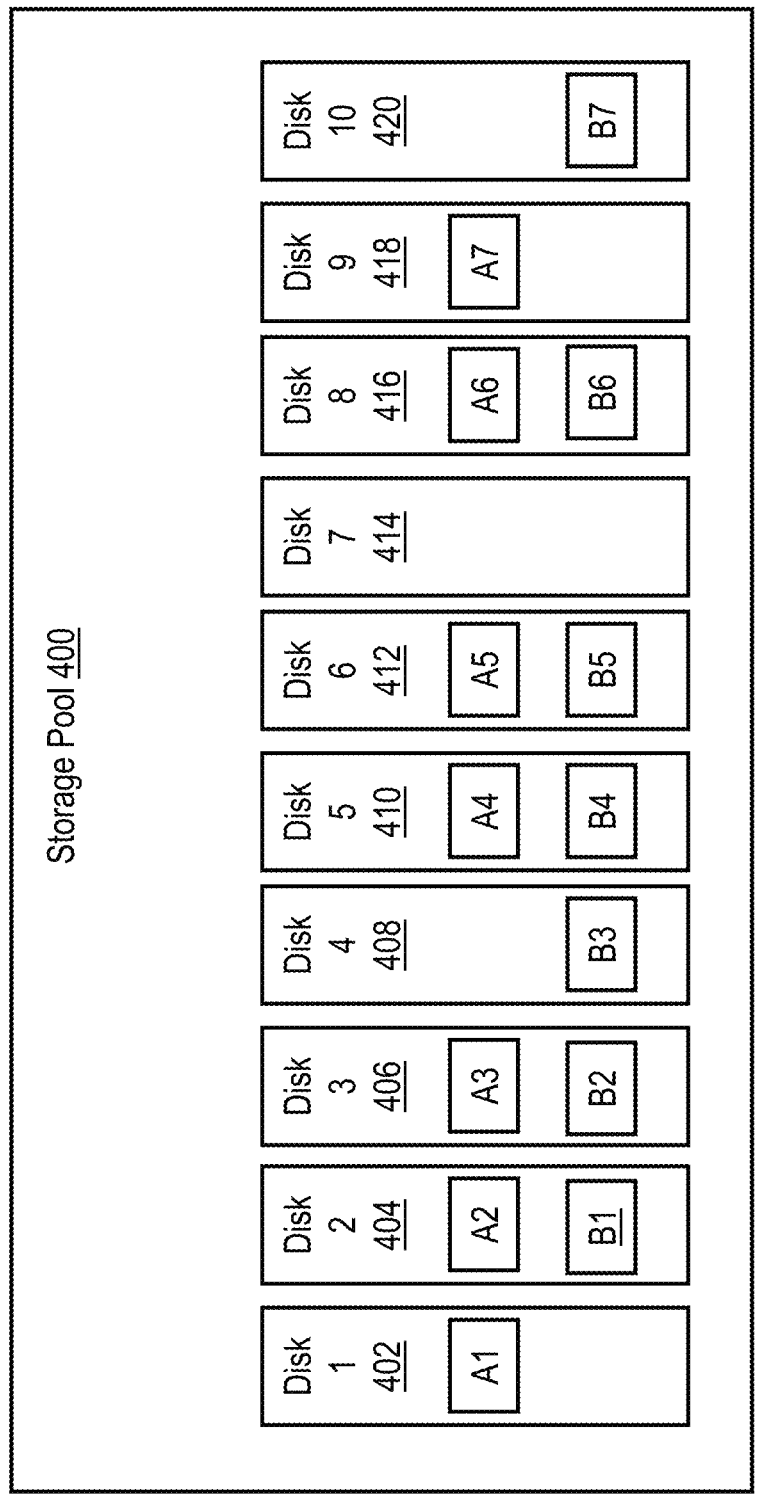
FIG. 4 is a diagram of an exemplary conventional storage pool that includes multiple disks with at least some of the disks storing data from multiple clients.

In FIG. 4, an application block for tenant 'A' is divided into four data blocks A1, A2, A3, and A4 with three parity blocks A5, A6, and A7 implemented. Similarly, an application block for tenant 'B' has been divided into four data blocks B1, B2, B3, and B4 with three parity blocks B5, B6, and B7 implemented. It should be appreciated that disks 404, 406, 410, 412, and 416 store data blocks associated with multiple tenants. Assuming the disks 402-420 are hard disk drives (HDDs), reading data of tenant 'A' from a shared disk does not adversely affect data of tenant 'B' stored on the same HDD. However, when drives 402-420 are SSDs, reading data of tenant 'A' from a shared disk may corrupt data of tenant 'B' stored in a same SSD block of the SSD due to the known issue of read disturbance.

It should be appreciated that a typical application configures block size based on data access requirements. For example, portions of an application block can be mapped to one or multiple pages in an SSD block. As one example, if an SSD block has eight 2 k sized pages and application block size is 4K, one application block may be mapped to two SSD pages and four application blocks may be mapped inside a single SSD block. For large size application blocks, more than one SSD block may be used.

A flash read operation is accomplished by raising a voltage level on word lines of a memory cell. It should be appreciated that raising a voltage level on word lines of a memory cell may impact voltage levels on neighboring word lines. As such, a read of one memory cell of a NAND flash may cause surrounding memory cells to change over time, if the surrounding memory cells of the block are not rewritten. The read-induced error (or read disturbance) is not detected when reading the read memory cell, but may be detected during a subsequent read of the surrounding memory cells. Since data is read at a page granularity, a page with heavy reads exposes other pages in a same SSD block to read disturbance, which may result in loss of data in the other pages in the same SSD block. As used herein, a "heavily read hot block" or "heavy read block" is a block which is read with relatively high frequency. Frequency is relative to workloads being executed on storage, but in general terms a read of a single block several times in a second to several times every microsecond can be categorized as a heavy read block.

Erasure codes may be implemented in applications with high reliability requirements. As previously mentioned, an erasure code requires splitting application blocks into multiple data blocks with one or more parity blocks. The data and parity blocks are then written across multiple SSD disks. Splitting application blocks into multiple data and parity blocks and storing the data and parity blocks across multiple disks provides the benefits of parallel I/O access. Data and parity blocks of an application block may be stored on a single page or multiple pages of an SSD block.

Figure 5:
FIG. 5 is a diagram of an exemplary conventional solid-state device (SSD) based storage pool with at least some SSD blocks storing data from multiple clients.

It should be appreciated that SSD storage can be used to store information for multiple tenants (clients). As shown in FIG. 5, storage pool 500 includes six SSD disks 502-512 (labeled 'Disk1', 'Disk2', 'Disk3', 'Disk4', 'Disk5', and 'Disk6'). Storage pool 500 stores application block 'A' (AppBlockA) information that is owned by Tenant 'A' and application block 'B' (AppBlockB) information that is owned by Tenant 'B'. In this example, AppBlockB information is a heavily read hot block. AppBlockA information is split into three data blocks (labeled A1, A2, and A3) with two associated parity blocks (labeled 'Ap1' and 'Ap2'), which are stored on pages of SSD Block1, Block4, Block5, Block7, and Block10, respectively (which are assigned to disks 502-510, respectively). As is shown, AppBlockB information is split into three data blocks (labeled B1, B2, and B3) with two associated parity blocks (labeled 'Bp1' and 'Bp2'), which are stored on pages of SSD Block1, Block5, Block7, Block10, and Block11, respectively (which are assigned to disks 502, 506, 508, 510, and 512, respectively).

In the example of FIG. 5, SSD Block1, Block5, Block7, and Block10 store AppBlockA information and AppBlockB information in different pages of the respective blocks. As previously mentioned, heavy reads on AppBlockB information may result in an increased read disturbance on associated SSD blocks which can corrupt AppBlockA information. As mentioned above, read disturbance can result in loss of information if proper precaution is not taken. Conventional read disturbance precaution procedures have moved information from an old SSD block to a new SSD block when a read count on the old SSD block exceeded a certain threshold value (e.g., five reads within one second). However, moving information to a new SSD block is costly in terms of I/O operations. Some conventional read disturbance precaution procedures have moved certain pages of an SSD block after a threshold count value is exceeded, but have not differentiated or selected only hot read pages. For tenant 'A', moving pages of tenant 'A' introduces unnecessary overhead due to activities of tenant 'B'. In fact, a malicious tenant can initiate a high read attack to destroy data of other tenants or adversely affect I/O performance of other tenants. Conventionally, high read attacks have not been controlled.

According to one embodiment of the present disclosure, respective tenants are separated at an SSD block level so that data of one tenant is not corrupted by read activity of another tenant. The disclosed techniques provide information protection in multi-tenant (multi-client) environments such that when data is stored on SSDs using an erasure code, tenant data on pages of an SSD block are assigned to ensure that high reads of one tenant will not corrupt data of other tenants due to an SSD read disturbance. According to one or more embodiments, ownership of an SSD block is assigned to a particular tenant to ensure that no two tenants share a same SSD block in an erasure code environment.

According to at least one embodiment, each SSD block is assigned to an owner when a first page of the SSD block is written and the assignment is maintained until a given SSD block is erased. For example, SSD block assignments may be maintained in a file system that manages a storage pool or SSD block assignments may be maintained in a separate data structure (e.g., a table that includes owner information for each SSD block in a storage pool) that is accessible by a storage pool manager. An SSD block is deemed "empty" when the SSD block is recently erased and none of its pages are written with application data or associated parity data. An SSD block is deemed "partially-filled" when only some pages of the SSD block are written, and an SSD block is deemed "full" when all pages of the SSD block are written.

For an application block write (allocation) request by given application tenant, on a given disk, all partially-filled SSD blocks with a same owner as the application tenant are checked to determine whether a given write request can be written to a partially-filled SSD block assigned to the given application tenant. If a partially-filled SSD block is found, a write is performed on empty pages of the partially-filled SSD block. If a partially-filled SSD block is not found for the given tenant, an empty SSD block is located and assigned to the tenant, and an application write operation is performed on the pages of the empty SSD block. In various embodiments, write information includes a tenant identifier (ID). For example, the tenant ID can be passed by writing to one or more reserved fields of a small computer system interface (SCSI) command descriptor block (CDB). The ID can, for example, be provided by a tenant application or supplied by a file system. In general, the disclosed techniques may be employed when application data stored on a single disk is less than an SSD size. In an erasure code environment, for parallel I/O access performance benefits, an application block is usually split into multiple blocks and stored on separate disks and, as such, there is high probability that an effective size of application block per disk is less than an SSD block size, e.g., SSD block size can be 16 MB with four pages (4 MB each), and an application block size can be 32 MB. In an erasure code environment, if an application block size is split into four disk blocks, each disk may be assigned 8 MB of data, which can be stored on two pages of one SSD block. Conventionally, the remaining two pages of each SSD block could be shared with another application. The disclosed techniques prevent an enterprise storage manager from storing data of multiple tenants in a same SSD block, as reading data of one tenant can corrupt data stored by another tenant in the same SSD block.

With reference to FIG. 6, information regarding SSD disks may be maintained in a data structure 600, which may take the form of a table. As is shown, data structure 600 maintains an entry for each SSD block of each SSD disk allocated. In data structure 600 three SSD disks are allocated (i.e., SSD disk1, SSD disk2, and SSD disk3). SSD disk1 has four SSD blocks, SSD disk2 has four SSD blocks, and SSD disk3 has two SSD blocks. Data structure 600 maintains owner, status, and free page information for each SSD entry. For example, data structure 600 may be referenced by erasure code logic during an application write operation. As one example, a tenant ID may be associated with an application block write request. For example, SCSI protocol reserved bits can be used to specify application ID information. As one example, a CDB for SCSI write(16), as per SCSI-3, may be employed. As another example, reserved bits from byte 14 (e.g., bits 5 and 6) and byte 1 (e.g., bit 2) may be used to specify eight different tenant IDs for a data processing system accessing a storage pool. To provide for additional tenants (or applications), a SCSI extended CDB can be utilized. In one embodiment, a tenant ID is provided to an application by a system based on the number of applications that are accessing a given storage pool.

According to the present disclosure, a tenant aware write in SSD erasure code environment can be accomplished via erasure code logic that splits application blocks into multiple data blocks with associated parity blocks. For example, a disk list may be generated that includes a list of disks determined by erasure code logic to store data and parity blocks associated with a given application block. The disk list may maintain SSD block numbers on each SSD disk. Each SSD disk in the SSD disk list can then be referenced to retrieve an SSD block whose ownership is established by tenant ID. As each SSD block has an associated status (e.g., full, partially-filled, and empty) with a number of free pages in the SSD block, a determination can be made as to the condition of each SSD block. If no SSD block is located for a given tenant, an SSD block that is empty may be assigned to the tenant. Subsequent to assigning the tenant to the SSD block, write operations may be performed on the pages of the block. Following the write operations, a free page count for the SSD block may be updated. If all pages of SSD block are written, the SSD block is marked as full. If all pages of an SSD block are not written, a status of the SSD block is marked (or maintained) as partially-filled.

According to one or more embodiments, the disclosed techniques advantageously address data security/integrity concerns by segregating tenant data. According to another aspect of the present disclosure, the segregation of SSD block allocation (e.g., by tagging writes with a tenant ID) may be extended by, for example, implementing application IDs as read disturbances may occur for an SSD block that is assigned to a single tenant when multiple applications of the single tenant are writing to a single SSD block. For example, a first application associated with a single tenant may corrupt data associated with a second application associated with the single tenant when the first application and the second application utilize a same SSD block for storing data.

Figure 7:
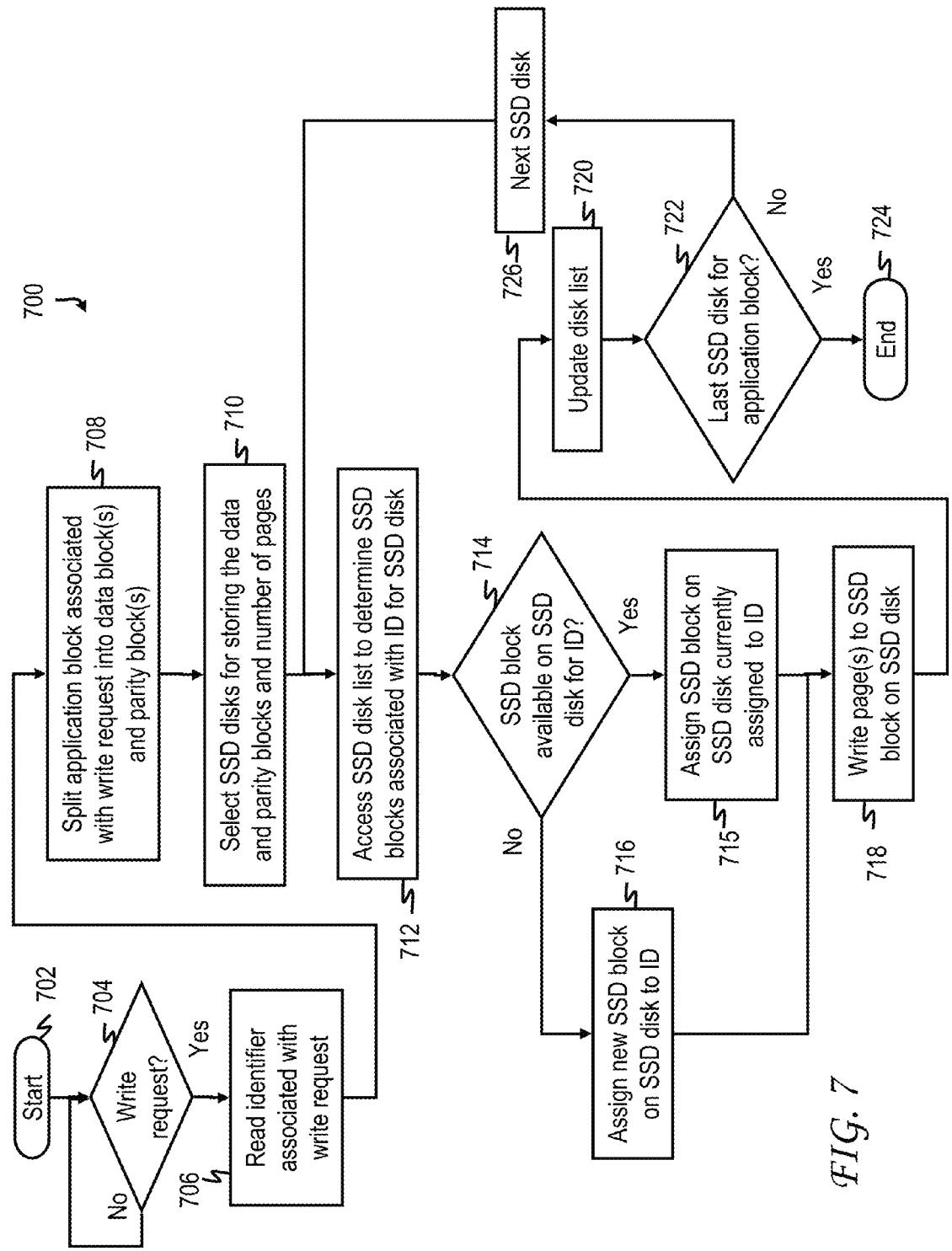
FIG. 7 is a flowchart of an exemplary process for protecting data in an SSD based storage pool based on identifiers (IDs), according to an embodiment of the present disclosure.

With reference to FIG. 7, an exemplary process 700 for protecting information (data) in an SSD based storage pool based on identifiers (IDs), according to an embodiment of the present disclosure, is illustrated. Process 700 may be implemented, for example, through the execution of one or more program modules 42 (see FIG. 1) of cloud control software (e.g., an enterprise storage manager) residing in management layer 64 (see FIG. 3) by processor 16 (of computer system 12). In this case, processor 16 may correspond to a storage area network (SAN) controller that controls access to, for example, storage system 34 of FIG. 1. In this case, storage system 34 includes a number of SSD disks.

Process 700 may, for example, be initiated in block 702 in response to receipt of a request (e.g., a read request or a write request) by processor 16. Next, in decision block 704, processor 16 determines whether the request corresponds to a write request. In response to the request not corresponding to a write request, processor 16 handles the request using other processing, and control loops on block 704. In response to the request corresponding to a write request, control transfers to block 706. In block 706, processor 16 reads an identifier (ID) associated with the write request. For example, the identifier may correspond to a tenant ID, an application ID, or both a tenant ID and an application ID.

Next, in block 708, processor 16 splits an application block associated with the write request into one or more data blocks with one or more parity blocks. Then, in block 710, processor 16 selects SSD disks for storing the data and parity blocks based on the ID associated with the write request (as well as selecting a number of pages to write to each SSD block). Next, in block 712, processor 16 accesses an SSD disk data structure, for example, data structure 600 of FIG. 6, to determine which SSD blocks are associated with the ID for an SSD disk. Then, in decision block 714, processor 16 determines whether SSD blocks are available on the SSD disk for the ID.

As one example, assume processor 16 was searching for an available SSD block on SSD disk number 1 that was assigned to a second tenant (i.e., tenant2 ID). In this case, there are no available SSD blocks currently assigned to the second tenant, as SSD block number 3 of SSD disk number 1 is full. In response to SSD blocks not being available on the SSD disk for the ID in step 714 (e.g., currently assigned SSD blocks on the SSD disk that are assigned to the ID are currently full or no SSD blocks are currently assigned to the ID), control transfers to block 716. In block 716 processor 16 assigns a new SSD block on the SSD disk to the ID. For example, processor 16 may assign SSD block numbers 2 or 4 (which are empty) to the second tenant on SSD disk number 1. From block 716 control transfers to block 718.

In response to SSD blocks being available on the SSD disk for the ID in step 714 (e.g., currently assigned SSD blocks for the SSD disk are empty or partially-filled), control transfers to block 715. In block 715, processor 16 assigns the write to an SSD block of an SSD disk that is currently assigned to the ID. For example, if the write request is for a first tenant (as indicated by a tenant ID (i.e., tenant1 ID)) and one page is to be written to SSD disk number 1, processor 16 may assign the write to block number 1 of SSD disk number 1. Next, in block 718, processor 16 writes the page or pages (e.g., a data block or a parity block) to the SSD block on the SSD disk.

Then, in block 720, processor 16 updates the SSD disk data structure as required. For example, the status (i.e., partially-filled) of block number 1 of SSD disk number 1 would remain unchanged in the example above. However, the free page count of block number 1 of SSD disk number 1 would be updated to 1 (indicating block number 1 of SSD disk number 1 has one free page) in the example above. Next, in decision block 722, processor 16 determines whether the SSD disk was the last SSD disk to be written with data from the current application block. If the SSD disk is not the last disk to be written with data from the current application block, control transfers from block 722 to block 726, where a next SSD disk to be written is selected, and then control returns to block 712. If, however, the SSD disk is the last disk to be written with data from the current application block, process 700 terminates in block 724. It should be appreciated that the writing of SSD blocks has been described serially for ease of description. However, it should be appreciated that SSD blocks may be written in parallel according to the present disclosure.

Accordingly, techniques have been disclosed herein that may advantageously protect information in a solid-state device based storage pool.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of protecting stored information from read disturbance, comprising:
    receiving, by a data processing system, a first write request to a solid-state device (SSD) in a storage pool that employs an erasure code, wherein the first write request has an associated identifier and associated data;
    in response to receiving the first write request, assigning, by the data processing system, the first write request to two or more SSD blocks of the SSD device based on the identifier; and
    writing, by the data processing system, pages of the associated data to the assigned SSD blocks, such that each SSD block holds data associated with only a single identifier.

2. The method of claim 1, wherein the assigning, by the data processing system, the first write request to one or more SSD blocks of the SSD device based on the identifier further comprises:
    assigning, by the data processing system, the first write request to two or more SSD blocks of the SSD device based on the identifier when a respective first page of the two or more SSD blocks is written; and
    maintaining, using the data processing system, the assignments of the two or more SSD blocks until the two or more SSD blocks are erased.

3. The method of claim 1, wherein the identifier identifies an application associated with the write request and no two applications have the same identifier.

4. The method of claim 1, wherein the identifier identifies a tenant associated with the write request and no two tenants have the same identifier.

5. The method of claim 1, wherein the assignment is maintained in a file system that manages the storage pool or is maintained in a separate data structure.

6. The method of claim 1, further comprising:
    receiving a second write request to the SSD;
    determining whether data associated with the second write request can be written to partially-filled SSD blocks of the SSD device that are associated with the identifier;
    in response to determining the data associated with the second write request can be written to partially-filled SSD blocks of the SSD device that are associated with the identifier, writing the data to the partially-filled SSD blocks; and
    in response to determining the data associated with the second write request cannot be written to partially-filled SSD blocks of the SSD device that are associated with the identifier, writing the data to one or more empty SSD blocks of the SSD device that are assigned to the identifier.

7. The method of claim 1, wherein the associated data is striped across multiple SSD disks each of which includes one or more SSD blocks, and wherein each of the SSD blocks includes multiple pages.

8. The method of claim 1, wherein the associated data includes application data and parity data.

9. A computer program product for protecting stored information from read disturbance, the computer program product comprising:
    a computer-readable storage device; and
    program code embodied on the computer-readable storage device, wherein the program code, when executed by a data processing system, causes the data processing system to:
        receive a first write request to a solid-state device (SSD) in a storage pool that employs an erasure code, wherein the first write request has an associated identifier and associated data;
        in response to receiving the first write request, assign the first write request to two or more SSD blocks of the SSD device based on the identifier; and
        write pages of the associated data to the assigned SSD blocks, such that each SSD block holds data associated with only a single identifier.

10. The computer program product of claim 9, wherein the program code, when executed by the data processing system, further causes the data processing system to:
    assign the first write request to two or more SSD blocks of the SSD device based on the identifier when a respective first page of the two or more SSD blocks is written; and
    maintain the assignments of the two or more SSD blocks until the two or more SSD blocks are erased.

11. The computer program product of claim 9, wherein the identifier identifies an application associated with the write request and no two applications have the same identifier.

12. The computer program product of claim 9, wherein the identifier identifies a tenant associated with the write request and no two tenants have the same identifier.

13. The computer program product of claim 9, wherein the assignment is maintained in a file system that manages the storage pool or is maintained in a separate data structure.

14. The computer program product of claim 9, wherein the program code, when executed by the data processing system, further causes the data processing system to:
    receive a second write request to the SSD;
    determine whether data associated with the second write request can be written to partially-filled SSD blocks of the SSD device that are associated with the identifier;
    in response to determining the data associated with the second write request can be written to partially-filled SSD blocks of the SSD device that are associated with the identifier, write the data to the partially-filled SSD blocks; and in response to determining the data associated with the second write request cannot be written to partially-filled SSD blocks of the SSD device that are associated with the identifier, write the data to one or more empty SSD blocks of the SSD device that are assigned to the identifier.

15. The computer program product of claim 9, wherein the associated data is striped across multiple SSD disks each of which includes one or more SSD blocks, and wherein each of the SSD blocks includes multiple pages.

16. The computer program product of claim 9, wherein the associated data includes application data and parity data.

17. A data processing system, comprising:
a memory; and
a processor coupled to the memory, wherein the processor is configured to:
receive a first write request to a solid-state device (SSD) in a storage pool that employs an erasure code, wherein the first write request has an associated identifier and associated data;
in response to receiving the first write request, assign the first write request to two or more SSD blocks of the SSD device based on the identifier; and
write pages of the associated data to the assigned SSD blocks, such that each SSD block holds data associated with only a single identifier.

18. The data processing system of claim 17, wherein the processor is further configured to:
assign the first write request to two or more SSD blocks of the SSD device based on the identifier when a respective first page of the two or more SSD blocks is written; and
maintain the assignments of the two or more SSD blocks until the two or more SSD blocks are erased.

19. The data processing system of claim 18, wherein the processor is further configured to:
receive a second write request to the SSD;
determine whether data associated with the second write request can be written to partially-filled SSD blocks of the SSD device that are associated with the identifier;
in response to determining the data associated with the second write request can be written to partially-filled SSD blocks of the SSD device that are associated with the identifier, write the data to the partially-filled SSD blocks; and
in response to determining the data associated with the second write request cannot be written to partially-filled SSD blocks of the SSD device that are associated with the identifier, write the data to one or more empty SSD blocks of the SSD device that are assigned to the identifier.

20. The data processing system of claim 17, wherein the identifier identifies an application associated with the write request or a tenant associated with the write request, and wherein the associated data is striped across multiple SSD disks each of which includes one or more SSD blocks, where each of the SSD blocks includes multiple pages and the associated data includes application data and parity data.

* * * * *